(12) United States Patent
Ross et al.

(10) Patent No.: US 10,781,577 B2
(45) Date of Patent: Sep. 22, 2020

(54) ARRANGEMENT FOR INSTALLATION IN A FLUID LINE NETWORK, CONNECTOR AND FLUID METER

(71) Applicants: DIEHL METERING GMBH, Ansbach (DE); DIEHL METERING S.A.S., Saint Louis (FR)

(72) Inventors: Benjamin Ross, Schmallenberg (DE); Jan Neidinger, Willstaett (DE); Oliver Schlegel, Murr (DE); Benjamin Fischer, Karlsbad (DE); Michael Schimetzki, Karlsruhe (DE); Chinh-Duc Nguyen, Pforzheim (DE)

(73) Assignees: Diehl Metering GmbH, Ansbach (DE); Diehl Metering S.A.S., Saint Louis (FR)

( * ) Notice: Subject to any disclaimer, the term of this patent is extended or adjusted under 35 U.S.C. 154(b) by 255 days.

(21) Appl. No.: 15/975,061

(22) Filed: May 9, 2018

(65) Prior Publication Data
US 2018/0328007 A1  Nov. 15, 2018

(30) Foreign Application Priority Data
May 9, 2017  (DE) .................. 10 2017 004 450

(51) Int. Cl.
*E03B 7/07* (2006.01)
*G01F 15/18* (2006.01)
(Continued)

(52) U.S. Cl.
CPC ............ *E03B 7/074* (2013.01); *G01F 15/003* (2013.01); *G01F 15/005* (2013.01); *G01F 15/06* (2013.01);
(Continued)

(58) Field of Classification Search
CPC ........ G01F 15/14; G01F 15/063; G01F 15/06; G01F 15/125; G01F 15/003;
(Continued)

(56) References Cited

U.S. PATENT DOCUMENTS 3,563,512 A * 2/1971 Hauffe .................... F16K 5/045
251/312
4,605,036 A * 8/1986 Smith .................. F16K 5/0435
137/327
(Continued)

FOREIGN PATENT DOCUMENTS

DE         29706059 U1   10/1997
DE     102007020535 A1   11/2008
(Continued)

*Primary Examiner* — Suman K Nath
(74) *Attorney, Agent, or Firm* — Laurence A. Greenberg; Werner H. Stemer; Ralph E. Locher

(57) ABSTRACT

An arrangement for installation in a fluid line network contains a fluid meter having a housing with a fluid inlet and a fluid outlet, and a volume measuring part. At least one connector, which is intended for connection to the housing of the fluid meter, is either equipped with an additional function or configured for the adaptation of an additional function on the connector. The connector has a connector inflow and a connector outflow. The fluid meter and the connector form a modular unit that can be installed in the fluid line network.

18 Claims, 6 Drawing Sheets

(51) Int. Cl.
*G01F 15/00* (2006.01)
*G01F 15/06* (2006.01)
*G01F 15/12* (2006.01)
*G01F 1/66* (2006.01)
*G01F 25/00* (2006.01)

(52) U.S. Cl.
CPC ............ *G01F 15/125* (2013.01); *G01F 1/662* (2013.01); *G01F 15/061* (2013.01); *G01F 15/185* (2013.01); *G01F 25/0007* (2013.01)

(58) Field of Classification Search
CPC .... G01F 15/005; G01F 15/061; G01F 15/185; G01F 25/0007; G01F 1/662; E03B 7/074
See application file for complete search history.

(56) References Cited

U.S. PATENT DOCUMENTS

| | | | | |
|---|---|---|---|---|
| 5,257,538 | A | * | 11/1993 | Spendell ............... G01F 15/005 73/198 |
| 5,706,851 | A | * | 1/1998 | Lopez-Gomez ...... F16K 5/0407 137/246.22 |
| 2004/0021120 | A1 | * | 2/2004 | Turnau, III ........... F16K 5/0414 251/309 |
| 2005/0155422 | A1 | | 7/2005 | Frank |
| 2007/0181191 | A1 | * | 8/2007 | Wittig ..................... F16K 11/20 137/551 |
| 2010/0043568 | A1 | | 2/2010 | Wakamatsu |
| 2012/0193559 | A1 | | 8/2012 | Benson et al. |
| 2012/0300402 | A1 | * | 11/2012 | Vos ....................... H01L 23/427 361/701 |
| 2013/0298695 | A1 | | 11/2013 | Kuhlemann et al. |
| 2014/0260657 | A1 | | 9/2014 | Strom et al. |
| 2016/0341584 | A1 | | 11/2016 | Naganuma et al. |
| 2017/0152979 | A1 | * | 6/2017 | Klein .................. F16L 37/0985 |

FOREIGN PATENT DOCUMENTS

| | | |
|---|---|---|
| DE | 102009042679 A1 | 3/2011 |
| DE | 102012009076 A1 | 11/2013 |
| DE | 202015101027 U1 | 7/2016 |
| EP | 0431222 A1 | 6/1991 |
| EP | 1847814 A2 | 10/2007 |
| EP | 2098835 A1 | 9/2009 |

\* cited by examiner

ARRANGEMENT FOR INSTALLATION IN A FLUID LINE NETWORK, CONNECTOR AND FLUID METER

CROSS-REFERENCE TO RELATED APPLICATION

This application claims the priority, under 35 U.S.C. § 119, of German application DE 10 2017 004 450.3, filed May 9, 2017; the prior application is herewith incorporated by reference in its entirety.

BACKGROUND OF THE INVENTION

Field of the Invention

The present invention relates to an arrangement for installation in a fluid line network, to a connector for the arrangement according to the invention and to a fluid meter.

Fluid meters of the type in question are generally consumption measuring devices located within a supply network, for example for heat, gas or water, which display the actual consumption to the respective user of the connection. Furthermore, such consumption measuring devices may be incorporated in a communication network. In this case, they may be configured to transmit the consumption to a higher-level unit, such as for example a data collector or the switching center of the supplier. Consumption measuring devices that communicate in such a way are also referred to as "intelligent consumption measuring devices" or "smart meters". The use of intelligent consumption measuring devices dispenses with the need for manual meter readings and the supplier is able to produce invoices based on actual consumption in shorter times. Shorter intervals between readings mean in turn that it is possible for the rates at which the final customer is charged to be linked more precisely to electricity price movements in the markets. Supply networks can also be utilized much better.

In the case of fluid meters of the type in question, the flow rate or the fluid consumption is determined for example by mechanical, ultrasonic or magnetic-inductive measuring methods. Moreover, additional measuring parameters, such as for example the temperature of the fluid, may also be recorded. If, for example, the fluid meter is a water meter, the water meter inevitably represents part of the drinking water installation. In the German regulation on the quality of water for human use (TrinkwV), it is stipulated for example that chemical and microbial contaminations and undesired deposits must be avoided in drinking water installations. Accordingly important in this case is the monitoring of the general, chemical and microbial parameters concerned for the investigation of drinking water. These parameters are nowadays generally determined by sampling and subsequent laboratory investigation or on the basis of quick tests carried out in the field.

Published, non-prosecuted German patent application DE 10 2012 009 076 A1 (corresponding to U.S. patent publication No. 2013/0298695) describes a fluid meter which can be mounted on the outside of a pipeline ("clamp-on" meter) and in which additional units with an additional function are provided, such as for example a measuring unit for recording physical, chemical or biological properties of the fluid, an evaluation unit for evaluating the recorded data or a communication unit for data transmission. The units are configured here as one or more individual modules (functional units), it being possible for each individual module to be mechanically connected to the fluid meter. The individual modules and the fluid meter are in this case mounted on the pipeline, so that there is no direct contact with the fluid flowing through. Accordingly, it is also only possible for parameters which, on account of their function, do not require any fluid contact to be recorded by the individual modules.

German utility model DE 20 2015 101 027 U1 discloses a connector for installation in a pipeline or water conduit and also a connection arrangement consisting of a number of connectors. The connector has an inflow and an outflow, which are arranged lying opposite one another along an axis. By means of the inflow and the outflow, the connector is inserted into the pipeline. By means of flanges arranged on the upper side and underside, functional units, known as water treatment devices, such as for example water softeners or water filters, can be connected to the connector. The respective connector is constructed here in such a way that the water first flows through the connector and then flows out of the connector through the water treatment devices. As a result, it is ensured that water passes both water treatment devices when it flows through the connector, but as soon as one of the water treatment devices is removed or defective no water flows through. In the case of a removal or defect, the water flow must therefore be shut off.

SUMMARY OF THE INVENTION

The object of the present invention is to provide an arrangement and a fluid meter of the type in question with which additional functions can be adapted easily, quickly and with low maintenance.

According to the invention, the connector has its own connector inflow and connector outflow. As a result, fluid can be passed through the connector. For this purpose, the connector inflow and the connector outflow may be connected to one another directly by way of a channel within the connector. This results in the advantage that a measurement and/or treatment based on fluid contact can be performed in the connector according to the invention. Moreover, the fluid meter and the connector form a modular unit that can be installed in the fluid line network. The selection and installation of the additional function may be performed at the factory or else equally well in situ. This makes it easier and quicker for an additional function to be added and removed. The process of retrofitting existing devices is made considerably easier. The arrangement according to the invention creates a modular system, by which existing and/or additional functions can be easily implemented in a fluid circuit.

Expediently, a number of connectors may form a modular unit with one another, so that the fluid meter and the number of connectors form a modular unit that can be installed in the fluid line network. As a result, the installation is made considerably easier, in that the modular unit can be prefabricated at the factory according to the desired configuration in the particular case. The modular unit can subsequently be installed in the fluid line network in one installation step. When doing so, the connectors may be arranged upstream and/or downstream of the fluid meter or its volume measuring part in the direction of flow of the medium. The number of connectors is variable and can be adapted individually to the installation situation in situ or to the needs of the operator. The fact that a number of modular connectors are provided, either equipped with an additional function or at least configured for the adaptation of an additional function on the connector, means that any number of additional functions can be adapted.

Preferably, the respective connector can in turn be connected to a functional module. The functional module is accommodated in its own housing. Consequently, the connection device allows different functional modules to be easily installed or changed.

According to a preferred configuration, a plug-in connection may be provided between the fluid meter and the connector and/or a plug-in connection may be provided between the connector and the functional module and/or a plug-in connection may be provided between the fluid meter and the functional module. The plug-in connection may be configured in such a way that it essentially cannot be wrongly assembled or put together. As a result, a preferred orientation of the functional modules is easily achieved by the assembly. Moreover, no tool is required for the assembly of the fluid meter, the connectors and/or the functional modules to form the modular unit.

The specific function can be established by selecting the suitable functional module. For example, the functional module may be a descaler functional module, a filter functional module, a monitoring functional module, for example for monitoring the measuring accuracy of the fluid meter, a germ-reducing functional module, a pressure-reducing and/or pressure-regulating functional module, a functional module for determining chemical and/or microbiological parameters, an energy functional module, for example for providing an additional energy source, a data functional module, for example for storing the data, a communication functional module, for example for the radio transmission of the data occurring, a functional module for leakage detection, a display functional module, for example for the display of parameters on the arrangement, and/or a functional module for determining pH, electrical conductivity, nitrate, nitrite, sulfate, carbon dioxide, iron, fluoride, chlorine, copper, phosphate, silicon, ammonia, hardness, temperature, carbonate, salt content, germ content and/or metal content. There are accordingly a variety of additional functions that can be easily assigned to the fluid meter. Moreover, existing systems can be easily retrofitted with such additional functions.

In the case of the fluid meter, the connector and/or the functional module, at least one shut-off valve, preferably a plurality of shut-off valves, may be provided for shutting off and/or controlling the through-flow. The shut-off valves are in particular automatic, medium-actuated (for example pneumatic or hydraulic) manual or electrical (for example electromotive or electromagnetic) valves.

Furthermore, the connector may have a preferably switchable branching channel, which is for example connected to the through-channel between the connector inflow and the connector outflow. The branching channel may run through the connector as one part or more than one part, i.e. as a bypass channel with a feed and return.

Expediently, the functional module can be connected to the branching channel by way of a channel interface. Depending on whether the branching channel is designed as one part or as a bypass, the functional module may be configured here in such a way that it only allows (static) fluid contact (for example in the case of a one-part design) or is flowed through by fluid by way of a fluid inlet and a fluid outlet on the functional module (for example in the bypass).

Expediently, the modular unit consisting of connectors and the fluid meter can be aligned as running along a common axis. For example, the connectors and the fluid meter may be arranged along a through-flow axis of the medium. This allows an elongated form of the arrangement, which contains a fluid inlet and a fluid outlet in line with one another, whereby the fluid meter can be installed particularly easily in a fluid line network.

Furthermore, a communication module, which is for example arranged on the housing of the fluid meter, may be provided. The communication module serves for example for the purpose of collecting and storing data determined by the fluid meter, the functional modules and/or the connectors. Moreover, the communication module may contain at least one transmitting and receiving unit and also an antenna, by which wireless communication can take place, for example for data transmission with a higher-level data collector, the switching center of the supplier (for example consumption data transmission to a data collector), a smart home system or a network of fluid meters or their functional modules, for example via radio or mobile radio.

Preferably, the shut-off valves may have an automatic shut-off mechanism. For example, the shut-off mechanism may be coupled to a certain switch-off signal, which for example is received from the communication module. This results in the advantage that additional functions can be carried out. For example, in an emergency (for example a leakage), the fluid flow can be switched off automatically or by remote maintenance. Moreover, when a functional module is removed, the switching off of the through-flow through the bypass and/or the release of the through-flow on insertion of the functional module may take place automatically, in that shut-off valves in the functional module and/or in the connector are controlled by the insertion or the removal of the functional modules. This ensures that the functional modules can be safely installed and deinstalled easily by the user without service personnel. The handling and the safety of the arrangement are additionally improved as a result.

Expediently, a data line and at least one data interface may be provided on the fluid meter and/or on the connector and/or on the functional module. As a result, the data generated by the fluid meter and/or the individual functional modules can be transmitted by way of a common data line consisting of a number of individual data lines joined together in a modular manner within the arrangement, for example to the communication module.

In addition, an energy source, such as for example a battery, a rechargeable battery or a power pack with a power feed-in line, and/or an energy line and/or at least one energy interface may be provided on the fluid meter and/or on the connector and/or on the functional module. The energy interface allows the modular units to be connected to one another, so that they can optionally be supplied with energy from one to the other or operate autonomously in terms of energy. For example, an additional energy functional module, which can be changed routinely or when required in order to ensure the energy supply, may also be provided. As a result, the durability of the functional modules and the fluid meter is improved to a particular extent.

According to an alternative configuration of the present invention, the connector or else a number of connectors may be an integral part of the housing of the fluid meter, so that a common housing that essentially surrounds the component parts of the fluid meter and the connectors is provided.

Expediently, the housing may in this case comprise at least one receiving device, which is in each case assigned for example to a connector, the receiving device being configured for receiving the functional module. The functional modules can thereby be easily pushed or inserted into the receiving device. The handling of the functional modules is made particularly easy as a result.

Preferably, a connection device for the connection of the functional module is provided within the receiving device. In particular, the connection device may contain a plug-in connection, into which the functional module with a corresponding connection device can be inserted. An energy interface and/or a data interface, which by the inserting operation automatically contacts or forms a connection with for example a data and/or energy interface of the functional module, can thereby be provided in the region of the connection device.

In a practical way, the volume measuring part may be configured as a push-in module with its own housing, which can be introduced or inserted or pushed into the housing of the fluid meter or the receiving device. The volume measuring part consequently likewise represents a functional module which can be easily exchanged by the user when required, for example in the case of a defect, preferably without any tools. This results in the advantage that costs and time caused by maintenance work are saved.

Furthermore, an automatic data and/or energy connection of the functional module to another functional module, a connector, the fluid meter and/or the communication module can take place by way of the data and/or energy interface as soon as the functional module is connected to the connector. The data and/or energy connection may take place thereby in a wire-bound or wireless manner.

Independently, the present invention claims a connector, in particular for an arrangement according to the invention, which has a connector housing, a connector inflow and a connector outflow. The connector inflow and the connector outflow are preferably arranged on the connector lying opposite one another and along a common through-flow axis and are connected to one another directly by way of a through-channel within the connector. Moreover, at least one connection device may be provided for connecting a functional module or for adapting an additional function.

Expediently, a shut-off valve for shutting off and/or controlling the through-flow may be arranged within the through-channel between the connector inflow and the connector outflow.

In addition, the present invention claims a fluid meter, in particular of a modular construction, which contains a housing, a fluid inlet, a fluid outlet and a volume measuring part. Moreover, the fluid meter contains at least one connector, which is intended for connection to the housing of the fluid meter and is either equipped with an additional function or configured for the adaptation of an additional function on the connector. The connector may have its own connector inflow and connector outflow. In this case, the fluid meter and the connector form a modular unit which can be installed in the fluid line network.

Preferably, the housing of the fluid meter contains at least one receiving device, which is in each case assigned to a connector and is configured for example for receiving a functional module.

According to a preferred configuration, the volume measuring part of the fluid meter may be configured as a push-in module or as a functional module that can be easily introduced into a receiving device, i.e. for example pushed or inserted into it. As a result, the volume measuring part can be designed as a unit prefabricated at the factory, which if required can be installed or deinstalled particularly easily, preferably without any tools.

Other features which are considered as characteristic for the invention are set forth in the appended claims.

Although the invention is illustrated and described herein as embodied in an arrangement for installation in a fluid line network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
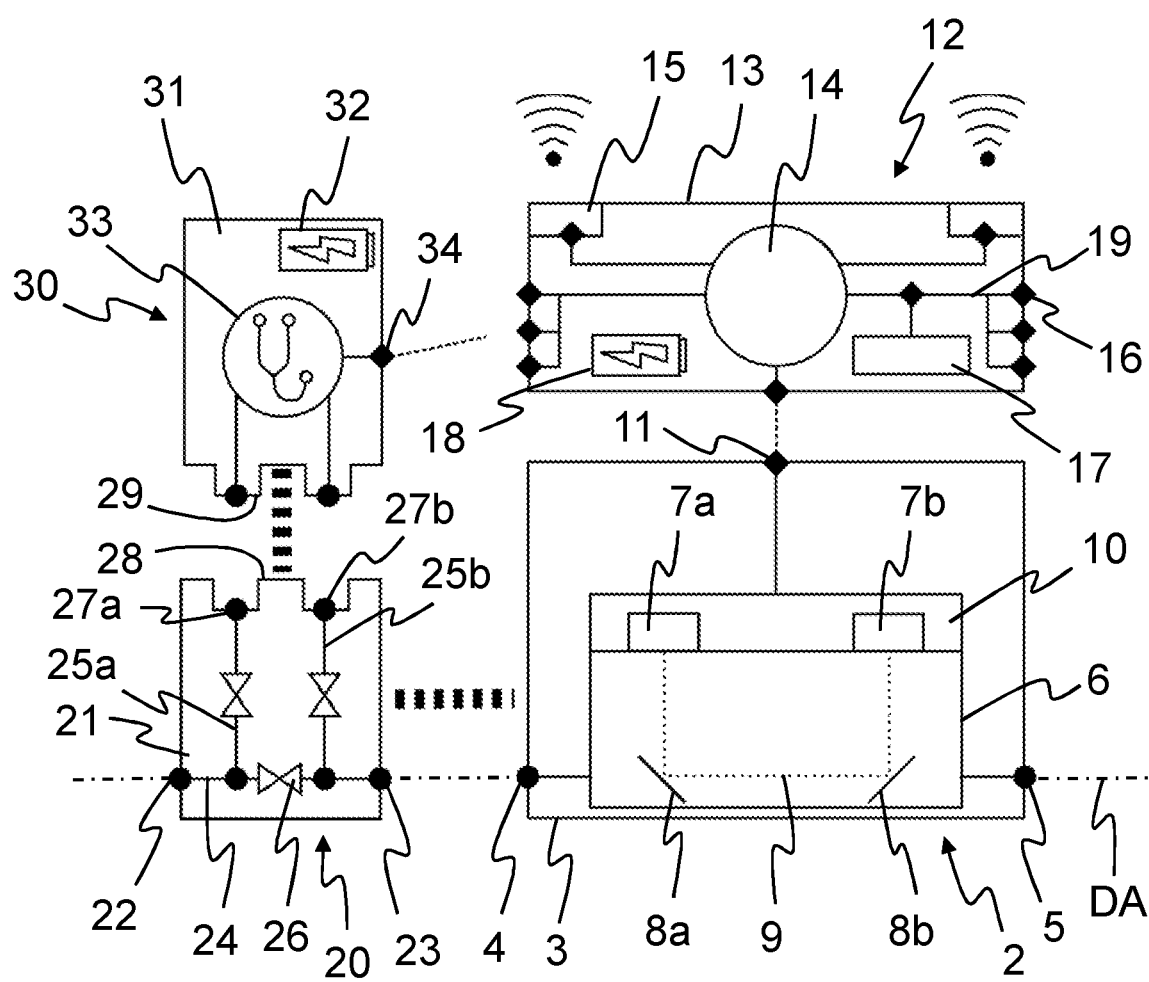
FIG. 1 is a simplified schematic representation of a first configuration of an arrangement according to the invention.

Referring now to the figures of the drawings in detail and first, particularly to FIG. 1 thereof, there is shown an arrangement 1 according to the invention, which contains a fluid meter 2 and a connector 20. The fluid meter 2 has a housing 3 with a fluid inlet 4 and a fluid outlet 5. The direction of through-flow of the fluid preferably runs from the fluid inlet 4 to the fluid outlet 5 along a through-flow axis DA. The fluid inlet 4 and the fluid outlet 5 are thereby arranged on the housing 3 lying opposite one another along the through-flow axis DA. Arranged inside the housing 3 is a volume measuring part 6, which has an ultrasonic measuring arrangement. Alternatively, however, some other volume measuring part 6, such as for example a mechanical impeller measuring part, a magnetic-inductive measuring part or the like, could also be provided.

The ultrasonic measuring arrangement contains two ultrasonic transducers 7a, 7b and a measuring section 8, which is located between the ultrasonic transducers 7a, 7b and, because of deflections by reflectors 8a, 8b, is formed in a U-shaped manner. The determination of the flow rate of the fluid may be performed here for example on the basis of a transit-time difference method. The control of the volume measuring part 6 or of the ultrasonic transducers 7a, 7b takes place by a control unit 10, which is assigned to the volume measuring part 6. The control unit 10 also serves the purpose of converting the signals of the ultrasonic transducers 7a, 7b into data and passing them via a data interface 11 to a communication module 12.

The communication module 12 contains a communication module housing 13, arranged in which is a processor 14, which can process the data of the volume measuring part 6 and control the communication module 12. The communication module 12 can transmit the data of the fluid meter or the consumption data by way of a transmitting and receiving unit 15, for example via radio, to a higher-level switching center of the supplier that is not represented in the figures or to a data collector. As an alternative or in addition, as shown in FIG. 1, a second transmitting and receiving unit 15 may be provided, by means of which the communication module 12 can communicate with other fluid meters 2 or communication modules 12. Furthermore, the communication module 12 contains data interfaces 16 for the connection of internal units and external devices, a data memory 17 for storing the data and an energy store 18 for supplying energy to the communication module 12, such as for example a battery or rechargeable battery. Alternatively, a power pack, not shown in the figures, with an energy feed-in line, which serves for supplying energy, may also be provided. Furthermore, data lines 19, by way of which the processor 14, the transmitting and receiving units 15, the data memory 17 and the data interfaces 16 are connected to one another, are provided within the communication module 12.

The connector 20 may be connected to the housing 3 of the fluid meter 2 by a connection device, for example a plug-in connection. The connection between the fluid meter 2 and the connector 20 is represented in FIG. 1 by a black, dashed line. The connector 20 contains a connector housing 21, which may for example be produced from metal or plastic. Furthermore, the connector 20 contains a connector inflow 22 and a connector outflow 23, which are directly connected to one another by way of a through-channel 24. Accordingly, the fluid flows through the connector 20 from the connector inflow 22 to the connector outflow 23. Arranged within the through-channel 24 is a shut-off valve 26, which is intended for shutting off or releasing the through-flow through the connector 20. As soon as the connector 20 is connected to the housing 3 of the fluid meter 2 by way of the connection device, the fluid can flow through the connector 20 and the fluid meter 2. The connector 20 and the fluid meter 2 are configured here in such a way that their connection is fluid-tight.

Figure 3A:
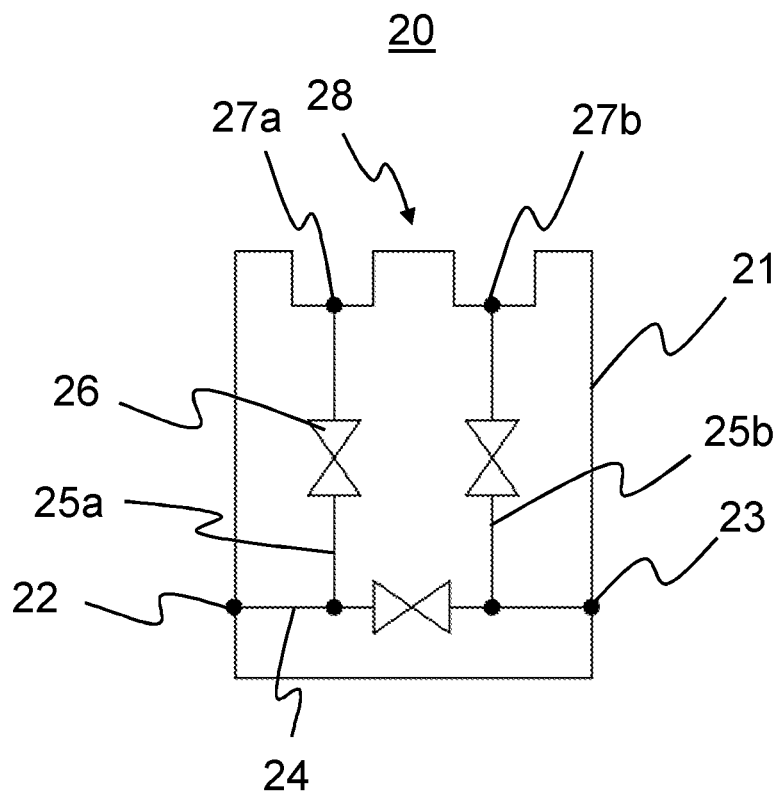
FIG. 3A is a simplified schematic representation of a configuration of the connector according to the invention.
Figure 3B:
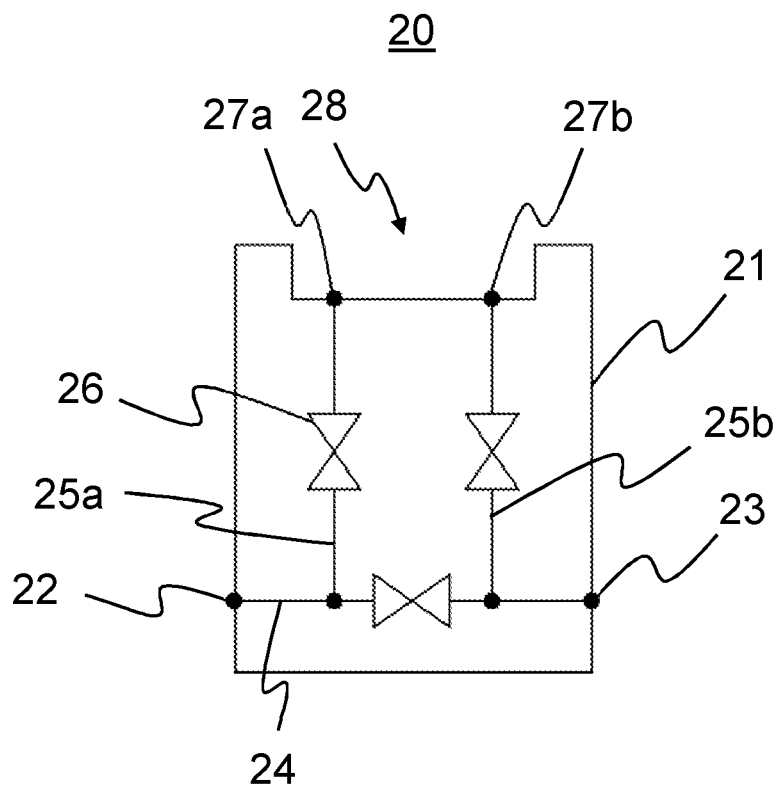
FIG. 3B is a simplified schematic representation of a further configuration of the connector according to the invention.

Provided in the upper region of the connector 20 is a connection geometry or a connection device for a functional module 30, which for example consists of a plug-in element 28. A corresponding counterpart of the functional module 30 can be inserted into or attached to the plug-in element 28. As a result, a functional module 30 can be connected to the plug-in element 28 of the connector 20. As shown on the basis of the plug-in element 28 in FIGS. 3A and 3B, the plug-in elements 28, 29 can be differently configured. This results in the advantage that only selected functional modules 30 can be connected to the connector 20 by a lock-and-key principle, so that error-free installation or connection of the functional modules 30 to the connector 20 is ensured ("Poka Yoke").

Figure 3C:
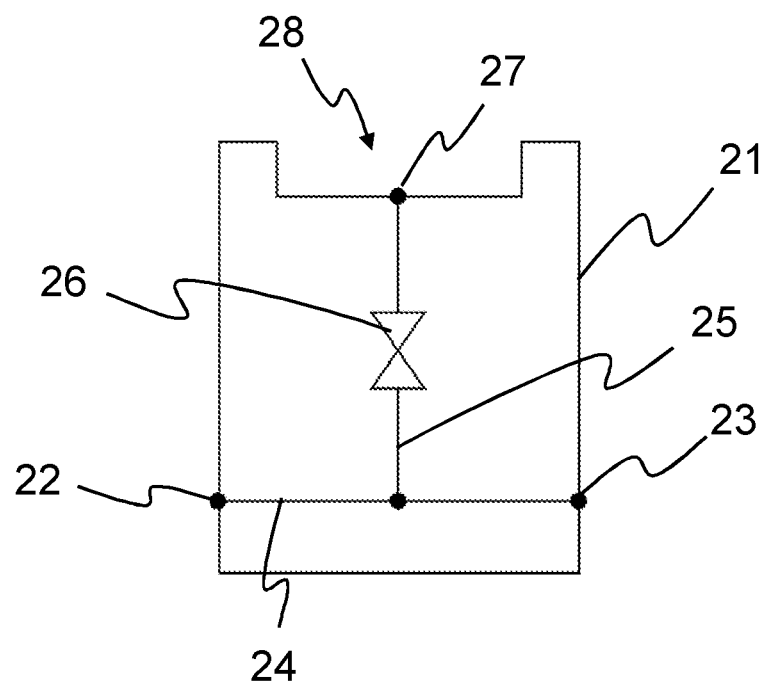
FIG. 3C is a simplified schematic representation of a further configuration of the connector according to the invention.

Expediently, the connector 20 may contain a bypass channel, consisting for example of two channel parts 25a, 25b, or a branching channel 25, as shown in FIG. 3C. The bypass channel serves the purpose of branching off the fluid by way of one channel part 25a and returning it by way of a second channel part 25b. As a result, for example, the functional module 30 connected at channel interfaces 27a, 27b can be flowed through with fluid. By contrast, the branching channel 25 serves the purpose of branching off the fluid from the through-channel 24 and passing it to a channel interface 27, so that for example fluid contact with the functional module 30 is made possible there without any through-flow. Moreover, a shut-off valve 26 may be respectively provided in the branching channel 25 or in the channel parts 25a, 25b of the bypass channel, in order to shut off the branched-off through-flow to the channel interface 27. Preferably, the shutting off is performed by an automatic shut-off mechanism, in that the fluid flow through the through-channel is shut off as soon as a functional module 30 is connected and the fluid flow through the bypass channel is shut off as soon as the functional module 30 is removed. The detection of whether or not a functional module 30 is connected may be performed for example by means of a sensor or a data and/or energy connection between the connector 20 and the functional module 30.

The functional module 30 contains a functional module housing 31 and an energy supply. An energy store 32, such as for example a battery or rechargeable battery, or a power pack that is not shown in the figures and an energy feed-in cable may be provided for example as the energy supply. Moreover, the functional module 30 contains a functional unit 33, which is configured to provide an additional function. Consequently, an additional function can be added to the fluid meter 2 by the connector 20, or the connector 20 itself serves for the adaptation of an additional function. Furthermore, the functional modules 30 may contain data lines and data interfaces 34, in order to communicate with other functional modules 30, connectors 20, communication modules 12 or the like. As an alternative or in addition, an additional communication unit (not shown) may also be provided within the functional module 30, in order to communicate with other components of the arrangement 1 wirelessly, for example via Bluetooth, or by Near Field Communication (NFC).

Figure 2:
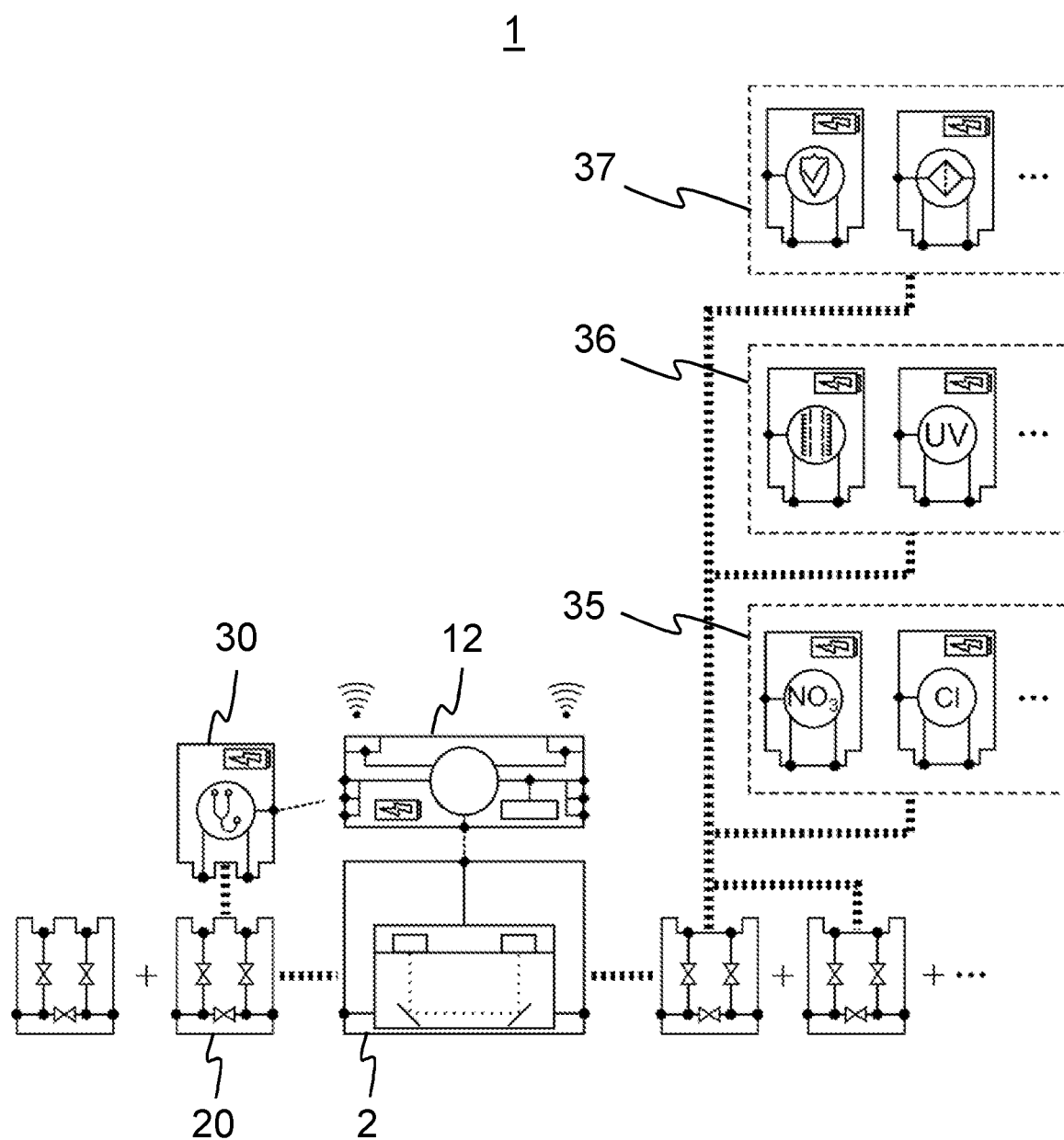
FIG. 2 is a simplified schematic representation of a further configuration of the arrangement according to the invention.

The functional modules 30 allow the fluid meter 2 or the arrangement 1 to be assigned a wide variety of additional functions according to choice. The functional modules 30 may be divided here into three essential module groups. FIG. 2 shows a schematic setup of an arrangement 1 according to the invention in which different functional modules 30 from the module group for parameter measurement 35, the module group for fluid treatment 36 and/or the module group for other functional modules 37 can be fitted, according to choice, onto a number of connectors 20 of the arrangement 1. For example, the module group for parameter measurement 35 contains a functional module 30 for nitrate determination and a functional module 30 for chlorine determination, whereby for example the nitrate and/or chlorine content of the fluid can be determined. Also provided as modules for fluid treatment are a descaling functional module and a germ-reducing functional module, which kills germs by use of a UV light source and reduces the germ count. Provided in addition as other modules are a filter functional module, which for example frees the fluid of suspended matter or filters it out, and a safety functional module. The safety functional module may for example determine improper handling of the fluid meter 2 or the arrangement 1, for example by means of a shock sensor. Functional modules 30 that do not require fluid contact or fluid through-flow, such as for example additional communication functional modules, which for example improve the transmission power or serve for the implementation of alternative radio standards, may also be provided. Such functional modules 30 have either sealing means, which close off or fluid-tightly shut off the channel interfaces 27, 27a, 27b, or they are attached or fitted onto corresponding connectors 20 without a branching channel 25 or bypass channel.

Figure 3D:
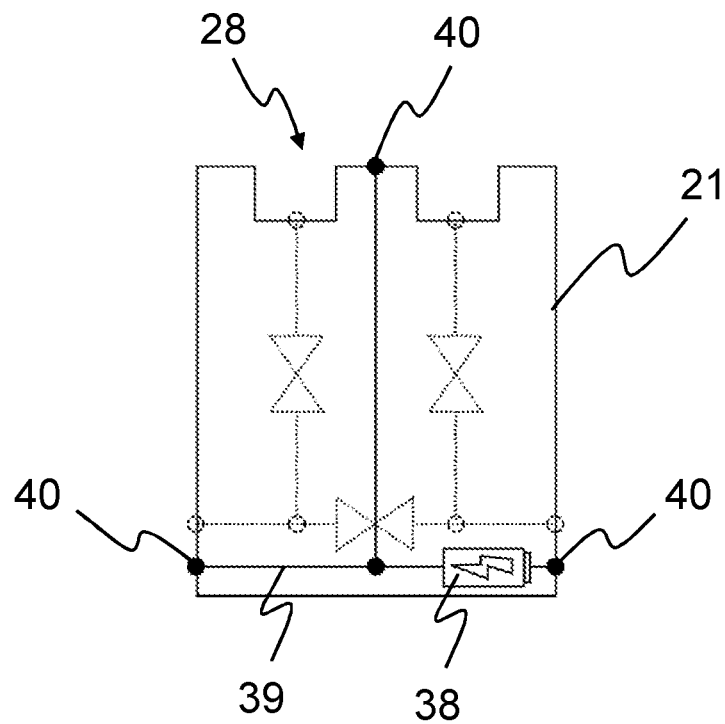
FIG. 3D is a simplified schematic representation of a further configuration of the connector according to the invention.

The arrangement 1 may also contain an energy management, which serves the purpose that the individual units or modules of the arrangement 1, such as for example the connector 20, the functional module 30, the communication module 12 and/or the fluid meter 2, can be supplied with energy from one to the other. For example, an additional common energy functional module, which can be changed routinely or when required in order to ensure the energy supply, may be provided. As shown on the basis of a connector 20 in FIG. 3D, energy lines 39, which connect the energy supplies, for example an energy store 38, of the individual modules to one another by way of energy interfaces 40, may be provided within a module. Furthermore, energy recovery functional modules, which for example recover energy by the fluid flow and feed this energy to the energy supplies by way of energy lines 39, so that the latter can use and/or store the energy, may be provided. Alternatively, all of the modules of an arrangement 1 could also be supplied with energy through the energy lines 39 and energy interfaces 40 by a single network connection.

Figure 4:
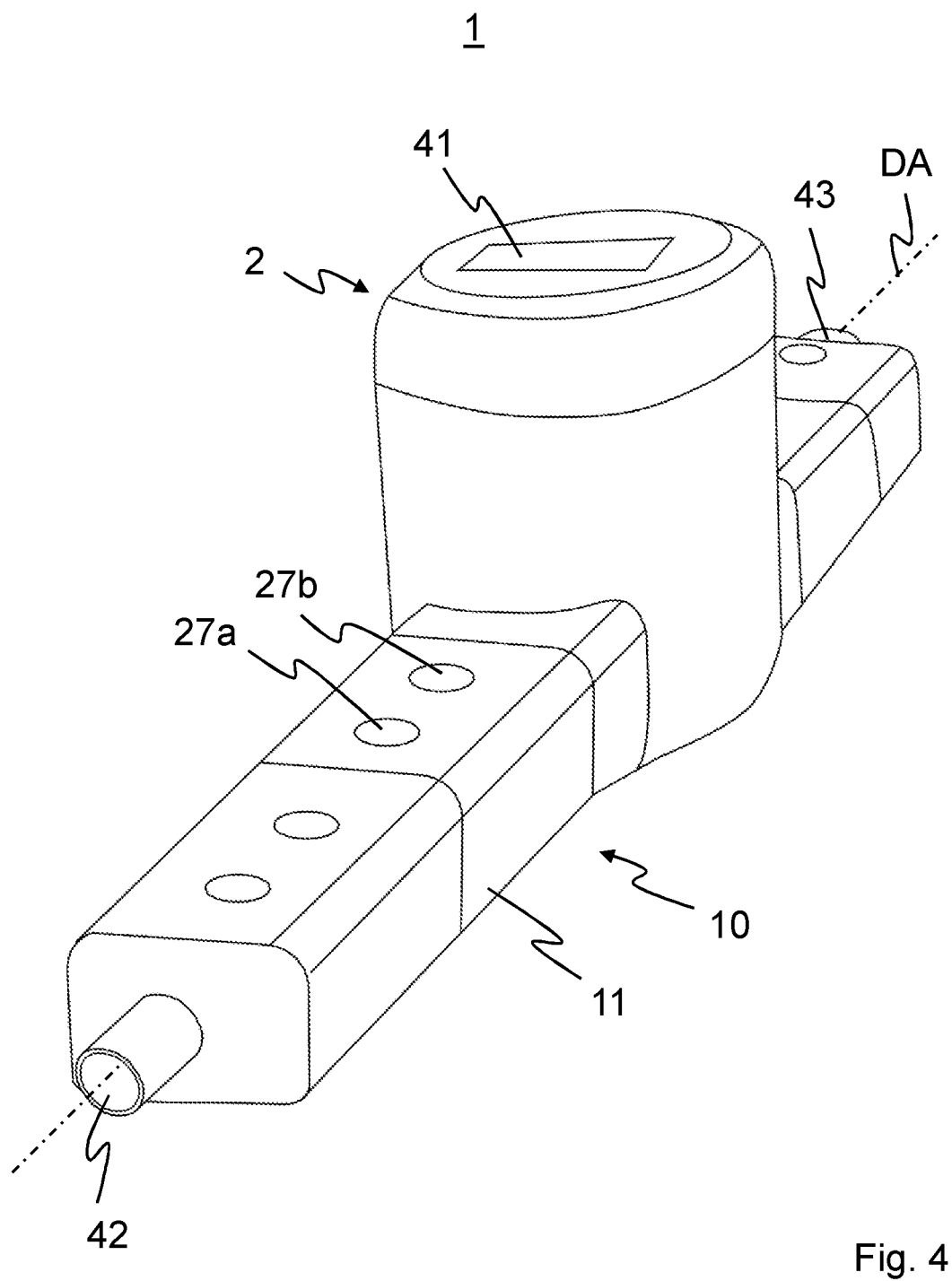
FIG. 4 is a simplified perspective representation of a further configuration of the arrangement according to the invention.

FIG. 4 shows a perspective representation of a configuration of the arrangement 1 according to the invention in which the fluid meter 2 and a number of connectors 20, which are arranged upstream and downstream of the fluid meter 2, form a modular unit. The arrangement contains the central fluid meter for determining the flow rate and four connectors 20 connected thereto. This arrangement 1 can be easily installed in a fluid line network (not shown) by means of a common fluid inlet 42 and a common fluid outlet 43. For this purpose, the common fluid inlet 42 and the common fluid outlet 43 have a corresponding connection, such as for example a thread or a plug-in connection, in order to be inserted into a pipeline of the fluid line network. Optionally, automatic or manual shut-off valves may moreover also be provided in and/or on the common fluid inlet 42 and fluid outlet 43.

Furthermore, the connectors 20 contain upper connection or plug-in elements that are not shown in FIG. 4. As a result, the connectors 20 can be fitted with functional modules 30 that provide the electrical contact for the channel interfaces 27a, 27b. Consequently, additional functions can be easily assigned to the arrangement 1 by adding functional modules 30 at the factory or subsequently (i.e. after installation in the fluid line network) without any tools. This realizes a modular concept in which the fluid meter 2 serves as a basic module to which additional functions can be assigned by means of connectors 20 and functional modules 30.

Figure 5:
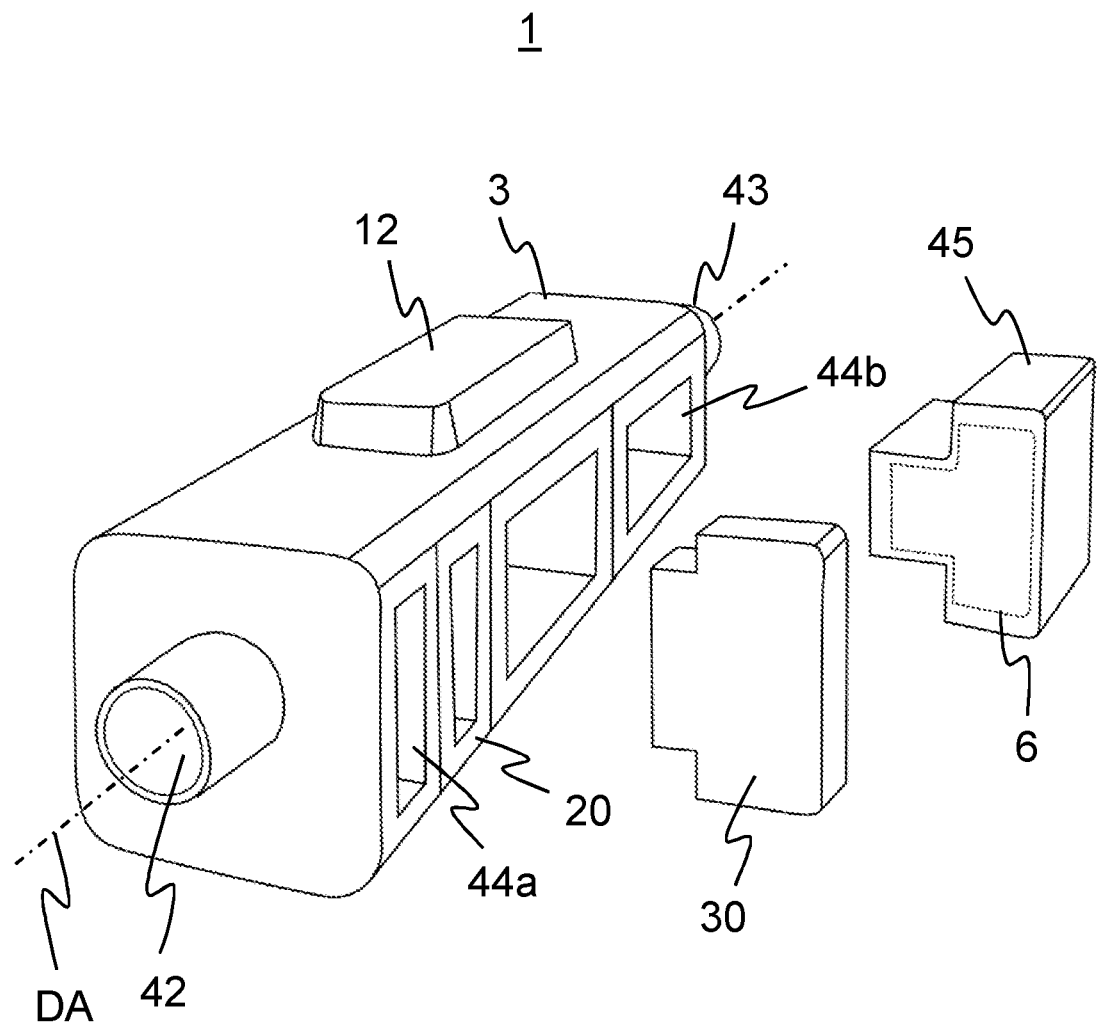
FIG. 5 is a simplified perspective representation of a further configuration of the arrangement according to the invention.

FIG. 5 shows an alternative configuration of the arrangement 1 according to the invention. Here, a number of connectors 20 are configured as an integral part of the housing 3 of the fluid meter 2. Consequently, the arrangement 1 contains a common housing 3, which contains the fluid meter 2 and the connectors 20. The connectors 20 are thereby assigned receiving devices 44a, 44b, which are configured for respectively receiving a functional module 30. For example, the receiving devices 44a, 44b may have different sizes for different sizes of functional modules. Here, smaller receiving devices 44a may serve the purpose of receiving smaller functional modules, which are intended for example just for measuring certain parameters, such as for example temperature, pressure, nitrate, chlorine or the like. Larger receiving devices 44b, which are for example designed for receiving functional modules 30 that are flowed through by fluid, and for example carry out a fluid or water treatment (descaling, softening, killing germs), may also be provided.

The receiving devices 44a, 44b preferably contain data, energy and/or channel interfaces 27, 27a, 27b arranged therein, i.e. the interfaces of the connectors 20 that provide the electrical contact for the functional modules 30 as soon as they are inserted into the respective receiving device 44a, 44b. In this case, the arrangement 1 is configured in such a way that insertion of the functional modules 30 into the respective receiving device 44a, 44b is automatically detected, for example on the basis of a transmission via the data interface, an RFID coupling, a mechanical switch, an optical sensor or some other sensor unit known from the prior art. As a result, the shut-off mechanism of the shut-off valves 26 can be controlled and/or a synchronization of the functional units or modules of the arrangement 1, in particular of the functional modules 30, can be performed. The arrangement 1 consequently represents a fitting with which a quick and easy change of functional modules 30 is made possible by a "Plug & Play" function. Furthermore, for this purpose, the communication module 12 may also be connected to the housing 3, which is connected directly to the functional modules 30 as soon as they are inserted. The connection may take place here in a wireless or wire-bound manner, according to choice.

According to a configuration as shown in FIG. 5, a volume measuring part 6, which is configured as a push-in module 45 and consequently contains the function of determining the through-flow or determining the flow rate, may be provided. The push-in module 45 may thereby be inserted or pushed into the receiving device 44b or the housing 3 of the fluid meter 2. It consequently likewise represents a functional module 30, which can be easily exchanged when required, preferably without any tools.

Alternatively, the connectors 20 and the functional modules 30 may also form a common modular unit, which as a push-in module can be introduced into a receiving device 44a, 44b. For this purpose, the receiving devices 44a, 44b are connected to the fluid inlet 42 and the fluid outlet 43, i.e. the receiving devices 44a, 44b are likewise flowed through by fluid as soon as there is no push-in module in the receiving device 44a, 44b. Accordingly, an additional placeholder module (not shown in the figures), which is configured for the purpose of being inserted into a receiving device 44a, 44b in order to make up for the absence of a functional module 30, may be provided. Preferably, the placeholder module likewise has an inlet, an outlet and a through-channel, connecting the inlet and the outlet, and optionally a data and/or energy interface in order to detect the presence of this placeholder module.

Also expressly included in the disclosure are individual combinations of features (subcombinations) and possible combinations of individual features of various embodiments that are not represented in the figures of the drawing.

The following is a summary list of reference numerals and the corresponding structure used in the above description of the invention:

1 Arrangement
2 Fluid meter
3 Housing
4 Fluid inlet
5 Fluid outlet
6 Volume measuring part
7a, 7b Ultrasonic transducer
8 Measuring section
9a, 9b Reflector 10 Control unit
11 Data interface
12 Communication module
13 Communication module housing
14 Processor
15 Transmitting and receiving unit
16 Data interface
17 Data memory
18 Energy store
19 Data line
20 Connector
21 Connector housing
22 Connector inflow
23 Connector outflow
24 Through-channel
25 Branching channel
25a, 25b Channel part
26 Shut-off valve
27, 27a, 27b Channel interface
28 Plug-in element
29 Plug-in element
30 Functional module
31 Functional module housing
32 Energy store
33 Functional unit
34 Data interface
35 Module group for parameter measurement
36 Module group for fluid treatment
37 Module group for other functional modules
38 Energy store
39 Energy line
40 Energy interface
41 Display
42 Fluid inlet
43 Fluid outlet
44a, 44b Receiving device
45 Push-in module
DA Through-flow axis

The invention claimed is:

1. A configuration for installing in a fluid line network, the configuration comprising:
   a fluid meter having a housing with a fluid inlet and a fluid outlet and a volume measuring part; and
   at least one connector connected to said housing of said fluid meter and equipped with an additional function or configured for an adaptation of the additional function on said at least one connector, said at least one connector having a connector inflow with a first connection device and a connector outflow with a second connection device, said connector inflow with said first connection device and said connector outflow with said second connection device being disposed coaxially with respect to a straight through-flow axis, said at least one connector further having a through-channel and said connector inflow and said connector outflow are connected directly by way of said through-channel;
   said fluid meter and said at least one connector forming a modular unit installable in the fluid line network;
   a shut-off valve disposed within said through-channel between said connector inflow and said connector outflow;
   said at least one connector having a switchable branching channel and/or a bypass channel;
   a functional module having a functional module housing, said at least one connector is connectable to said functional module, said functional module being connectable to said branching channel and/or said bypass channel, wherein the additional function is provided by said functional module and said functional module is at least one module selected from the group consisting of:
   a descaler functional module;
   a filter functional module;
   a pressure-reducing functional module;
   a monitoring functional module;
   a germ-reducing functional module;
   a functional module for determining chemical and microbiological parameters;
   a functional module for determining pH, electrical conductivity, nitrate, nitrite, sulfate, carbon dioxide, iron, fluoride, chlorine, copper, phosphate, silicon, ammonia, hardness, temperature, carbonate, salt content, germ content or metal content;
   an energy functional module;
   a data functional module;
   a communication functional module;
   a functional module for leakage detection; and
   a display functional module.

2. The configuration according to claim 1, wherein said at least one connector is one of a plurality of connectors forming a sub-modular unit with one another, so that said fluid meter and said plurality of connectors form said modular unit installable in the fluid line network.

3. The configuration according to claim 1, further comprising:
   a first plug-in connection is provided between said fluid meter and said at least one connector; and/or
   a second a plug-in connection is provided between said at least one connector and said functional module; and/or
   a third plug-in connection is provided between said fluid meter said functional module.

4. The configuration according to claim 1, wherein at least one of said fluid meter or said functional module contains at least one further shut-off valve for shutting off and/or controlling a through-flow.

5. The configuration according to claim 2, wherein said sub-modular unit containing said plurality of connectors and/or said modular unit containing said connectors and said fluid meter are aligned along a common axis.

6. The configuration according to claim 1, further comprising a communication module disposed on said housing of said fluid meter.

7. The configuration according to claim 1, further comprising an automatic shut-off mechanism having a plurality of shut-off valves.

8. The configuration according to claim 1, further comprising:
   a data line; and
   at least one data interface, said data line and said data interface are disposed on at least one of said fluid meter, said at least one connector and said functional module.

9. The configuration according to claim 1, further comprising at least one of an energy store, an energy line or at least one energy interface disposed on at least one of said fluid meter, said at least one connector or on said functional module.

10. The configuration according to claim 1, wherein said at least one connector is an integral part of said housing of said fluid meter.

11. The configuration according to claim 1, wherein said housing contains at least one receiving device, which is assigned to said at least one connector, said receiving device being configured for receiving said functional module.

12. The configuration according to claim 11, wherein said connection device, for a connection of said functional module, is provided within said receiving device.

13. The configuration according to claim 1, wherein said volume measuring part is a push-in module introduced into said housing of said fluid meter.

14. The configuration according to claim 6, wherein an automatic data and/or energy connection of said functional module to another functional module, said at least one connector, said fluid meter and/or said communication module takes place as soon as said functional module is connected to said at least one connector.

15. A connector, comprising:
a connector housing having a through-channel formed therein, a connector inflow with a first connection device and a connector outflow with a second connection device, said connector inflow with said first connection device and said connector outflow with said second connection device being disposed coaxially with respect to a straight through-flow axis;
a functional module;
at least one third connection device for connecting to said functional module;
said connector inflow and said connector outflow are connected directly by way of said through-channel within said connector;
a shut-off valve disposed within said through-channel between said connector inflow and said connector outflow;
said at least one connector having a switchable branching channel and/or a bypass channel;
said functional module being connectable to said branching channel and/or said bypass channel, said functional module being at least one module selected from the group consisting of:
a descaler functional module;
a filter functional module;
a pressure-reducing functional module;
a monitoring functional module;
a germ-reducing functional module;
a functional module for determining chemical and microbiological parameters;
a functional module for determining pH, electrical conductivity, nitrate, nitrite, sulfate, carbon dioxide, iron, fluoride, chlorine, copper, phosphate, silicon, ammonia, hardness, temperature, carbonate, salt content, germ content or metal content;
an energy functional module;
a data functional module;
a communication functional module;
a functional module for leakage detection; and
a display functional module.

16. A fluid meter, comprising:
a housing having a fluid inlet and a fluid outlet;
a volume measuring part; and
at least one connector connected to said housing of said fluid meter and is equipped with an additional function or configured for an adaptation of the additional function on said at least one connector, said at least one connector having a connector inflow with a first connection device and a connector outflow with a second connection device, said connector inflow with said first connection device and said connector outflow with said second connection device being disposed coaxially with respect to a straight through-flow axis, said at least one connector further having a through-channel and said connector inflow and said connector outflow are connected directly by way of said through-channel;
said fluid meter and said at least one connector forming a modular unit installable in the fluid line network;
a shut-off valve disposed within said through-channel between said connector inflow and said connector outflow;
said at least one connector having a switchable branching channel and/or a bypass channel;
a functional module having a functional module housing, said at least one connector is connectable to said functional module, said functional module being connectable to said branching channel and/or said bypass channel, wherein the additional function is provided by said functional module and said functional module is at least one module selected from the group consisting of:
a descaler functional module;
a filter functional module;
a pressure-reducing functional module;
a monitoring functional module;
a germ-reducing functional module;
a functional module for determining chemical and microbiological parameters;
a functional module for determining pH, electrical conductivity, nitrate, nitrite, sulfate, carbon dioxide, iron, fluoride, chlorine, copper, phosphate, silicon, ammonia, hardness, temperature, carbonate, salt content, germ content or metal content;
an energy functional module;
a data functional module;
a communication functional module;
a functional module for leakage detection; and
a display functional module.

17. The fluid meter according to claim 16, wherein said housing has at least one receiving device which is assigned to said at least one connector.

18. The fluid meter according to claim 17, wherein said volume measuring part is a push-in module and is introduced into said receiving device.

* * * * *